US008875140B2

(12) United States Patent
Santoli et al.

(10) Patent No.: US 8,875,140 B2
(45) Date of Patent: Oct. 28, 2014

(54) MANAGING JOB EXECUTION

(71) Applicant: International Business Machines Corporation, Armonk, NY (US)

(72) Inventors: Giulio Santoli, Rome (IT); Fabio Barillari, Rome (IT); Fabio Benedetti, Rome (IT); Pietro Iannucci, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/780,459

(22) Filed: Feb. 28, 2013

(65) Prior Publication Data

US 2013/0179889 A1    Jul. 11, 2013

Related U.S. Application Data

(63) Continuation of application No. 13/500,345, filed as application No. PCT/EP2010/062325 on Aug. 24, 2010, now Pat. No. 8,799,911.

(30) Foreign Application Priority Data

Oct. 12, 2009 (EP) .................................. 09172741

(51) Int. Cl.
*G06F 9/46* (2006.01)
*G06Q 10/06* (2012.01)
*G06Q 10/00* (2012.01)

(52) U.S. Cl.
CPC *G06F 9/46* (2013.01); *G06Q 10/06* (2013.01); *G06Q 10/00* (2013.01)
USPC ........................................... 718/101; 710/39

(58) Field of Classification Search
None
See application file for complete search history.

(56) References Cited

U.S. PATENT DOCUMENTS

| | | | | |
|---|---|---|---|---|
| 7,137,019 | B2 * | 11/2006 | Hellerstein et al. | 713/323 |
| 7,231,455 | B2 * | 6/2007 | Marejka et al. | 709/233 |
| 7,243,121 | B2 * | 7/2007 | Neiman et al. | 709/201 |
| 7,412,513 | B2 * | 8/2008 | Levanoni et al. | 709/225 |
| 7,516,458 | B2 * | 4/2009 | Babutzka et al. | 718/106 |
| 8,090,826 | B2 * | 1/2012 | Tran et al. | 709/225 |
| 8,117,500 | B2 * | 2/2012 | Ng | 714/38.1 |
| 8,281,309 | B2 * | 10/2012 | Meda et al. | 718/101 |
| 2006/0031842 | A1 * | 2/2006 | Neiman et al. | 718/103 |
| 2009/0327242 | A1 * | 12/2009 | Brown et al. | 707/3 |
| 2009/0327491 | A1 * | 12/2009 | Tran et al. | 709/225 |
| 2010/0082854 | A1 | 4/2010 | Rossen et al. | |
| 2010/0235840 | A1 * | 9/2010 | Angaluri | 718/102 |
| 2011/0055834 | A1 * | 3/2011 | Meda et al. | 718/101 |
| 2011/0167039 | A1 * | 7/2011 | Kol et al. | 707/633 |
| 2011/0258630 | A1 * | 10/2011 | Fee et al. | 718/101 |
| 2013/0013577 | A1 * | 1/2013 | Fee et al. | 707/703 |

* cited by examiner

*Primary Examiner* — Emerson Puente
*Assistant Examiner* — Mehran Kamran
(74) *Attorney, Agent, or Firm* — Paul S. Drake

(57) ABSTRACT

A method for managing jobs scheduled for execution on a target system in which some jobs may spawn additional jobs scheduled for execution on the target system including intercepting jobs scheduled for execution in the target system, determining whether there is resource sufficiency in the target system for executing jobs, responsive to an affirmative determination of resource sufficiency, releasing previously intercepted jobs for execution in the target system, computing a limit of a number of jobs which can be concurrently scheduled by an external system to the target system, and transmitting the computed limit to the external system.

17 Claims, 5 Drawing Sheets

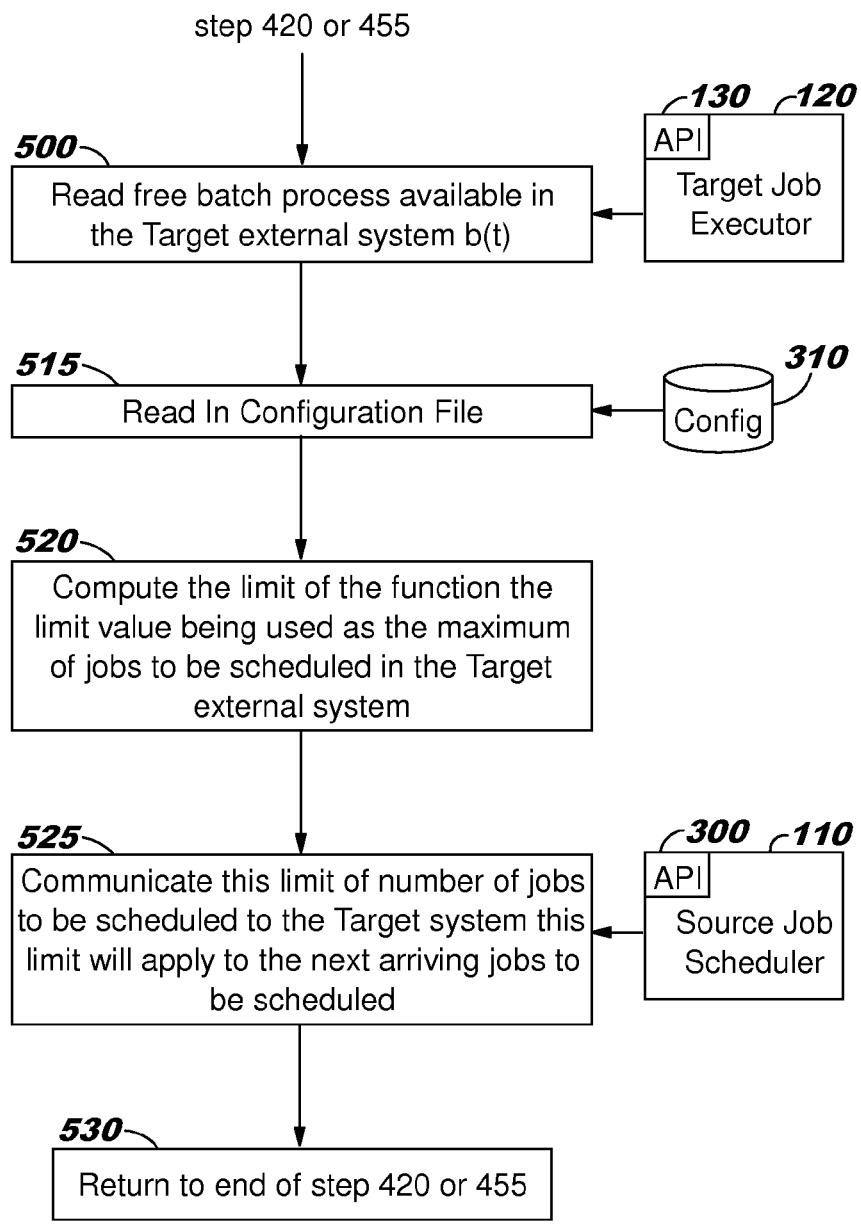

MANAGING JOB EXECUTION

CROSS REFERENCE TO RELATED APPLICATIONS

The present application is continuation of U.S. patent application Ser. No. 13/500,345 filed Apr. 5, 2012 entitled "MANAGING JOB EXECUTION"; which application is a United States national phase application filed pursuant to 35 USC 371 of International Patent Application Serial No. PCT/EP2010/062325, entitled A METHOD SYSTEM AND PROGRAM TO OPTIMIZE JOB EXECUTION SCHEDULED FROM AND EXECUTED ON EXTERNAL APPLICATION CONTAINERS, filed Aug. 24, 2010; which application claims priority to European Patent Application Serial No. 09172741.2, filed Oct. 12, 2009; which foregoing applications are incorporated herein by reference in their entireties.

BACKGROUND

1. Technical Field

The present invention generally relates to job execution and more particularly, to management of job execution when the jobs are scheduled from a source external system and executed on a target external system.

2. Description of Related Art

Application containers such as Enterprise Solution Resource Planning (ERP) systems based on SAP, JBoss, ORACLE E-Business suite or IBM Websphere Application Server are able to schedule execution of batch jobs on one other application container (SAP is a trademark or registered trademark of SAP AG in Germany and in several other countries all over the world, JBoss is a trademark of JBoss Inc., Oracle is a registered trademark of Oracle Corporation, IBM and Websphere are trademarks of International Business Machines Corporation in certain countries).

When submitting batch workload from an originating external system to be executed on a target external system, it is easy to overload the target system and reduce the job execution throughput scheduled from the originating system. The most usual cause is when jobs spawn several children jobs in the target external system, but the maximum number of processes able to run together is fixed in that target system. Moreover, in the target execution system, the management of the job execution queue decreases the overall efficiency and throughput. Some external systems can provide a simple load balancing but cannot manage a big amount of batch submissions.

There is thus a need to control in external systems execution of jobs scheduled from one other external system.

The U.S. Pat. No. 7,231,455 applies to controlling data packets by an external system. It uses a throttling mechanism to limit and control data packets. It is based on a cascaded pipeline architecture between the monitored relays. Data goes through this pipeline (of relays). The pipeline acts as a multilevel proxy between the source and destination. Both end points do not change their behaviors. Finally, it is "time period" based. It calculates the amount of data flow in each time period and decides to limit data fan out.

The U.S. Pat. No. 7,137,019 is an IBM patent describing an adaptive throttling system for reducing the impact of non-production work (less and less important) on productive work (more important) in data processing systems by selecting a performance impact limit to satisfy. It balances non-production and production work in a data processing system.

One other U.S. Pat. No. 7,243,121 describes a load balancing scheduling system to control execution of jobs and descendent jobs (children) on a multi-node distributed environment. The method described in U.S. Pat. No. 7,243,121 assumes that is known in advance a given number of children jobs created by a job in execution. In the general case the source scheduling system is not supposed to know that a job running on the target execution system (for example SAP) will or will not spawn children jobs and, in any case, the number of children jobs is not determined in advance. U.S. Pat. No. 7,243,121 splits the workload into several pieces and distribute it to different nodes that are under the control of the system. A new component provided in IBM Tivoli Workload Scheduler for Application 8.5 allows controlled release of jobs into a SAP system (the target external system) according to the current workload of the SAP system. This component is a program interfacing with the external system SAP controlling the scheduling of jobs inside SAP. It is a limiter that ensures that the number of concurrent jobs on SAP does not exceed the maximum resource capacity. This new component uses an API provided by the SAP external system to control job scheduling in the external system.

SUMMARY

A method for managing jobs scheduled for execution on a target system in which some jobs may spawn additional jobs scheduled for execution on the target system including intercepting jobs scheduled for execution in the target system, determining whether there is resource sufficiency in the target system for executing jobs, responsive to an affirmative determination of resource sufficiency, releasing previously intercepted jobs for execution in the target system, computing a limit of a number of jobs which can be concurrently scheduled by an external system to the target system, and transmitting the computed limit to the external system.

BRIEF DESCRIPTION OF THE SEVERAL VIEWS OF THE DRAWINGS

FIG. 5 is a detailed flowchart of the method of the preferred embodiment.

DETAILED DESCRIPTION

Figure 1:
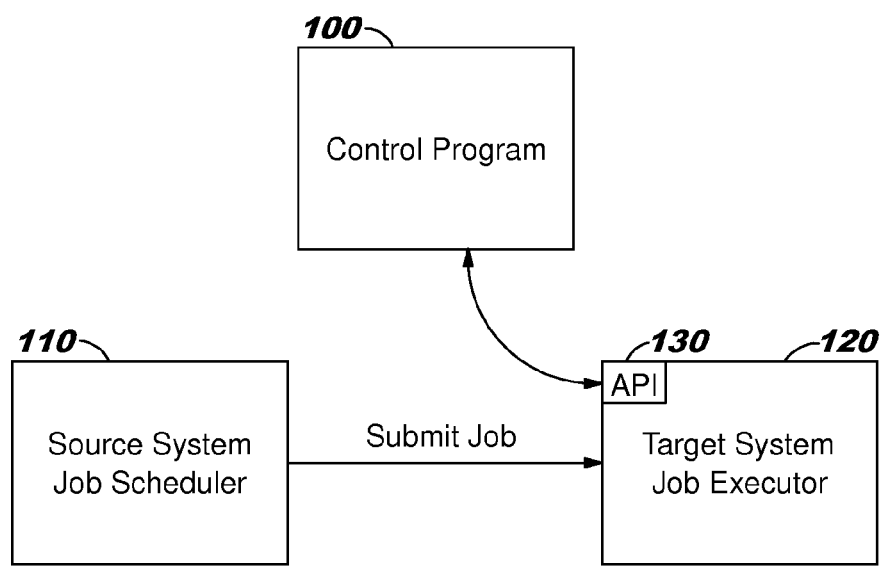
FIG. 1 illustrates the logical blocks for implementation of a control program according to the method of the prior art.

FIG. 1 illustrates the logical blocks of the implementation of the method of the prior art. This method is for controlling job execution in a Target external system (120), such as a SAP system, where these jobs have been scheduled from another external source system (110). The method may be implemented as a Control program (100) such as a computer program or other data processing system that interfaces with the Target system through a standard external system programming interfaces (130) such as XBP 2.0 with SAP. A person skilled in the art can adapt this solution to the use by the Control program of different user interfaces according to the ability of the Target external system. These interfaces may be remote (programming interfaces, Web User Interface) or local (Command lines, Graphical User Interface). This is why the Control program may be executed on a remote server or on the same server than the external Source or Target systems. As explained in more detail in relation with FIG. 2, the Control program suspends and releases jobs waiting for execution in the Target system. Through the interface, the Control program collects the following information: query list of jobs running on Target external system; query list of jobs which can be suspended or released in the Target external system; read the number of batch processes in the Target external system; read total number of running jobs on the Target system; read any required resource on Target system that is needed to run a job; release/resume an enqueued job in the Target system; and track the status of running jobs (running, complete) on the Target executing system.

Figure 2:
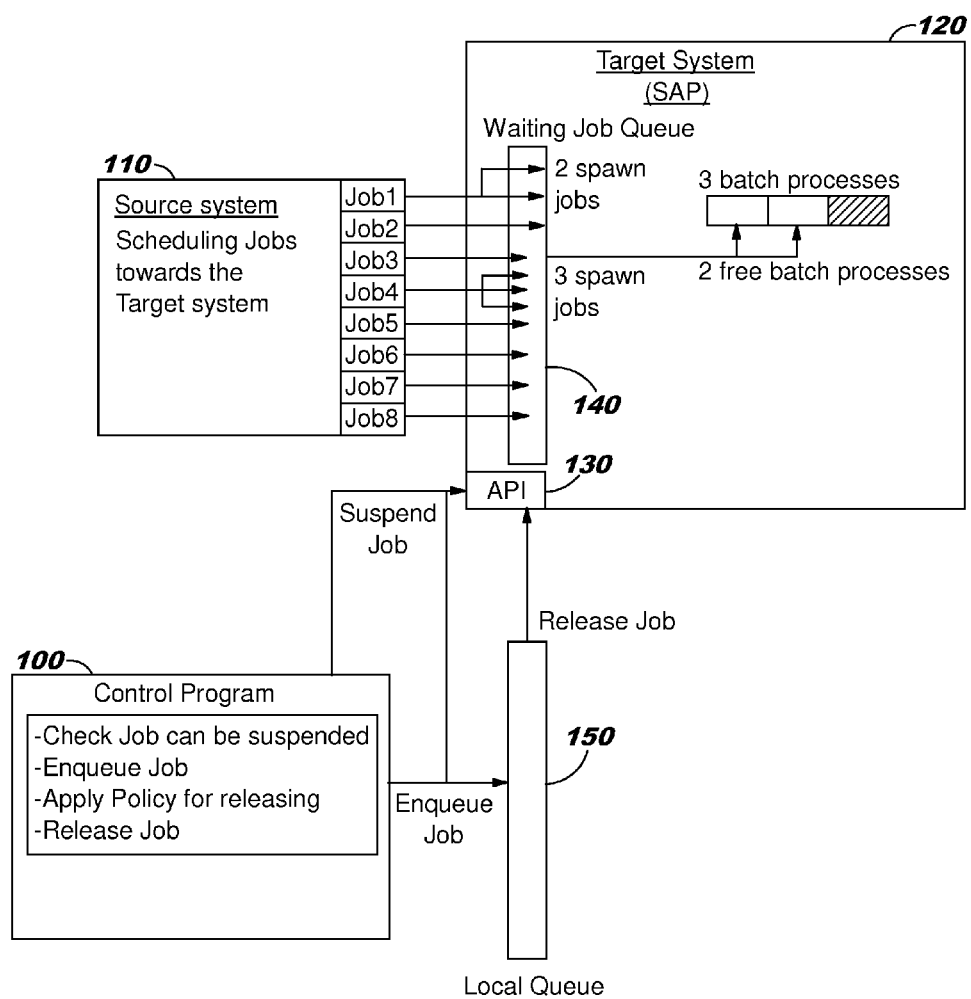
FIG. 2 illustrates the Control program logical blocks and system environment according to the method of the prior art.

FIG. 2 illustrates the Control program logical blocks and system environment according to the method of the prior art. In this method, the Control program (100) takes control of jobs (Job1, Job2 . . . Job8) which have been concurrently scheduled by the Source system (110) for execution in the Target system. The Control program takes control of the jobs once they have been queued in the waiting queue (140) of the Target system before execution. A single job scheduled can create spawned jobs in the Target system. For example, Job1 and Job4 have generated respectively 2 jobs and 3 jobs for execution in the Target system. Using the API of the Target system, the Control program intercepts the job in the waiting queue, suspends the job and enqueues it in a Local queue (150). To intercept jobs in SAP, for example, the SAP XBP2.0 API is used. According to customizable policies, spawned jobs can be suspended until an external program such as the Control program resumes it. The Control program uses different policies to resume suspended jobs such as:

resume as many jobs as the total number of batch processes in the SAP system; and resume as many jobs as the number of free batch processes in the SAP system;

These policies can be associated to criteria needed to prioritize suspended jobs:

jobs with higher priority must be resumed first; and jobs spawned by the same parent job must be resumed first.

It is possible to extend and customize these policies to adapt the control program to the needs of the workload systems.

Figure 3:
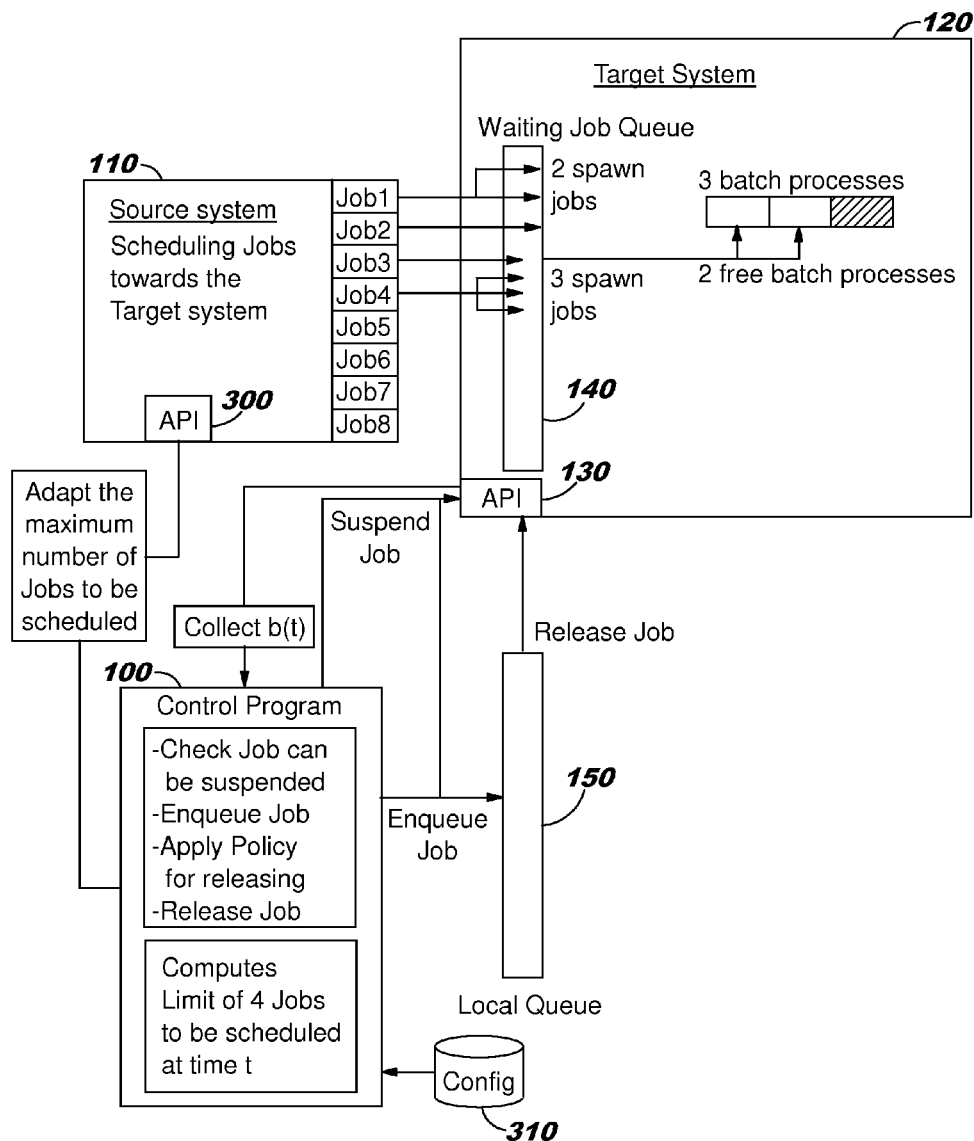
FIG. 3 illustrates the Control program logical blocks and system environment according to the preferred embodiment.
Figure 4:
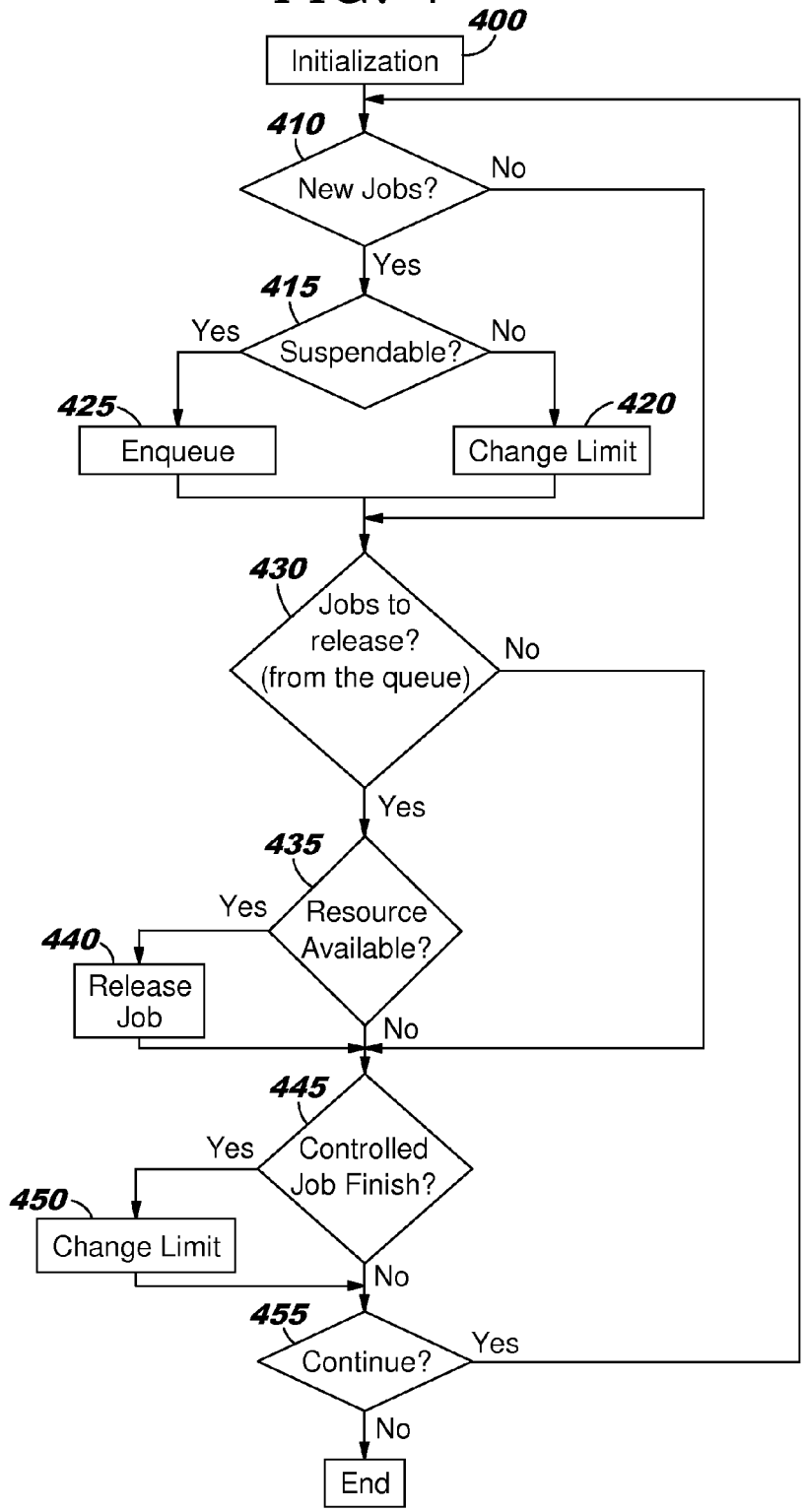
FIG. 4 is the general flowchart of the method of the preferred embodiment.

FIG. 3 illustrates the Control program logical blocks and system environment according to the method of the preferred embodiment. In order to optimize the resources available in the Target system, the algorithm of prior art can adapt the number of jobs to be released in the Target system to the number of free batch processes in the Target system. For example, the Control program can release as many jobs as the number of free batch processes in the Target system. However, in the preferred embodiment a solution is provided which goes over the best choice of policy to release jobs in the Target system. The method is to add a control on the Source system. Using the interface capabilities of the Source system, it is possible to add a second level throttling mechanism in order take the best advantage of the resources in the Target system to execute jobs. A new component is added in the Control program for making a computation of the maximum of jobs to be concurrently scheduled from the Source system to take the best advantage of the resources available in the Target system. In the example of FIG. 3, a maximum of 4 jobs can be scheduled by the Source system. This limit is computed by the Control program and imposed through the available API of the Source system. The control of the maximum of jobs concurrently scheduled by the Source system is done using available interfaces of the Source system. In the preferred embodiment an Application Programming Interface (300) is used. This limit adaptation (decrease or increase) can thus be done by a program automatically at given points in the general algorithm describing the Control program as illustrated in the flowchart of FIG. 4. As with the interface of the Target system, any other interface available in the Source system and supported by the operating system of the server on which the Control program is running can be used. As detailed in reference to FIG. 5, the computation of the limit of number of jobs to be scheduled depends on the resource available in the target system to executed batch jobs at a given t time and on the value of parameters. The parameter values can be read by the Control program from a configuration file (310) if they are user defined or can be automatically evaluated by a statistical analysis system, which monitors job execution throughput and adjusts the configuration to get the best performance.

It is noted that the computed limit at a given t time is based on the number of resources available for batch job execution at this given time. For example, the number free batch processes $b(t)$ in SAP Target systems at this given time as explained in more detail in reference to FIG. 5.

FIG. 4 is the general flowchart of the method of the preferred embodiment. In the initialization step (400) of FIG. 4, the program controlling both the jobs to be executed in the target executing system and the jobs scheduled from the source scheduling system is started. The controlling program communicates with the external systems using the available interfaces so that the program is dependent on the type of external systems it communicates with. The person skilled in the art can imagine extending the capability of the program to many types of external systems and even to more than one interface when they are available on a same target system. For simplification of the description, the detailed description of the preferred embodiment is focusing on one originating Source external system which schedules job into one Target execution external system.

A first part of the flowchart (410, 415, 425, 430, 435, 440), corresponds to the control existing in prior art on jobs scheduled in the target system performed by an external control program. With this first control, jobs scheduled in the target system are enqueued in a queue local to the control program and released when the program determines that the resources in the target system are available. Three new steps (420, 445, 450) of the preferred embodiment are added. They bring a second control by the control program which applies to the jobs scheduled by the Source scheduling system.

Periodically, with a time period, the program checks (410) if new jobs have been submitted in the Target system. This is done by reading the queue of submitted jobs in the Target system. For example, while using the SAP XBP2.0 API, the interface macros BAPI_XBP_JOB_SELECT and BAPI_XBP_CONFIRM_JOB are used to look into the SAP Job Queue and find new submitted jobs. By getting SAP job details, it is possible to find out whether the job has been spawned by one other job or not.

New jobs (answer Yes to test 410) are candidate to be controlled by the program if they can be suspended (415). In SAP, this checking is done using the macro BAPI_XBP_GET_INTERCEPTED_JOBS. However, some jobs cannot be suspended. Those jobs are submitted from external schedulers or those jobs not are matching the interception criteria stated in SAP Table TBCICPT1. If jobs in the scheduling queue of the target system can be suspended (answer yes to test 415), the program dequeues the jobs from the scheduling queue of the target external system and enqueues them in a queue local to the Control program.

If no job can be suspended among the new jobs scheduled in the target external system (answer No to test 415), then the program cannot delay the scheduling for execution of this job, but performs a second level of control at the level of the Source scheduling system. The control program changes in the target system the system parameter limiting (420) the number of jobs scheduled in the Target system. This step comprises a computation of the best limit to put in place according to the number of jobs currently executing and the resources available in the Target system (number of 'free processes' in the example of SAP). The computation is described in FIG. 5.

The program tests if the local queue has jobs to release (430). This step is also performed if there is no new jobs (answer No to test 410) which have been submitted in the Target system.

If there are jobs to be released from the Local queue of the Control program (answer Yes to test 430), the program checks if there are resources available in the Target system (435). This is done, for example, by using customizable policies such as provided with the SAP XBP2.0 API. Spawned jobs can be suspended until an external program (like the Control program described here) resumes them. As described in relation with description of FIG. 2, different policies to resume suspended jobs can be used.

If there is enough resource (answer yes to test 435) then the jobs are released (440) or otherwise transmitted from the local queue and re-included in the waiting queue of the Target system. In SAP, this is possible using the macro BAPI_XBP_JOB_START_ASAP.

When there are no more jobs to control in the Target external system (445) (end of step 440, answer No to test 435 and answer no to test 430) the program changes, in the target system, the system parameter adapting (450) the number of jobs to be scheduled in the target system. As in step 420, this step comprises a computation of the best limit representing the maximum of jobs to be submitted by the Source system in the Target system. This computation is done knowing the resources available for batch job execution in the Target system. In SAP, the maximum number of concurrent jobs is equal to the number of "SAP Background Processes". In this second execution of computation of limit in the flowchart of the method of the preferred embodiment, as there are resources available, the limit will be increased compared to the result of step 220 which reduces the limit. The computation is described in detail in relation with FIG. 5.

If the program is not stopped (answer Yes to test 455) the process goes on by checking (410) if new jobs have been scheduled by the originating external system in the target system. If not (answer No to test 455) the program ends.

In SAP only jobs that have been internally submitted or any spawned jobs can be intercepted by an external control program. Externally submitted jobs cannot be intercepted. So, when SAP is the target system, the Control program intercepts internally submitted jobs and spawned jobs and enqueues them in the local queue. But this is not the general case and the solution of the preferred embodiment considers the case where any job waiting for execution in the target system can be intercepted and enqueued in the local queue of the control program.

FIG. 5 is a detailed flowchart of the method of the preferred embodiment. The steps of this detailed flowchart are executed when the number of jobs to be scheduled in the Target system is set to a certain limit. These steps are executed when a new job to be executed in the Target system cannot be suspended by the control system (420) and the limit must be decreased to avoid overloading of the Target system. These steps are also executed when a job is released by the control program for execution in the Target system (450) and the limit must be increased to have a better use in the target system of all available resources to execute jobs.

The first step (500) is performed by the control program to check how many free batch processes b(t) are available in the Target system at this t time. Then, the Control program reads (515) in a Configuration file (310) parameters for preparing computation (520) of a formula to provide or otherwise transmit (525) the maximum number of jobs to be scheduled, prior to returning (530) processing to steps 420 or 455, knowing the value of these parameters at this t time and the number of free batch processes b(t) which are available in the Target system.

The number of concurrent jobs that can be submitted into the SAP system at time t is given by Limit(t). This function is calculated as follows:

$$\text{Limit}(t) = \alpha + \beta \cdot f(b(t) + \gamma)$$

where:

$\alpha$ is a positive or negative constant representing the minimum limit level (if positive) or a fixed negative bias (if negative), $\beta$ is the multiplying factor that translates the number of concurrent SAP jobs into concurrent external jobs, $\gamma$ is a positive or negative constant representing a reserved number of batch processes that must be left always free (if negative) or an additional bias to overload batch (if positive), and b(t) is the number of SAP free batch process available at time t, and $f(x)$ is a function such as:

Simple Moving Average of length n $$SMA^{(n)}(x_i) = \frac{x_t + x_{t-1} + \ldots + x_{t-n+1}}{n} = \frac{1}{n}\sum_{k=1}^{n} x_{i-k+1}$$

Exponential Moving Average of length n $$EMA^{(n)}(x_i) = \eta \cdot x_i + (1-\eta) \cdot EMA^{(n)}(x_{i-1})$$

Given configuration parameters $\alpha$, $\beta$, $\gamma$ and using the Simple Moving Average of length $\nu$, the computed limit value at time t will be:

$$\text{Limit}^{(\nu)}_{\alpha,\beta,\gamma}(t) = \alpha + \frac{\beta}{\nu} \cdot \sum_{k=1}^{\nu}(b(t-k+1)+\gamma)$$

Parameters $\alpha$, $\beta$, $\gamma$ and $\nu$ can be defined in a configuration setting or, optionally, they can evaluated by collecting statistical data on job execution.

If there are many jobs starting and finishing very quickly, then a slow update of the limit could be better to follow the actual average of the running jobs by ignoring unuseful fluctuations. On the opposite, if there are few slow jobs, then it could be better to change the limit with the same rate as the background processes. Regardless the adopted tuning parameters, the solution of the preferred embodiment is able to synchronize the scheduling among Source and Target systems and is also able to avoid that the Target system could get overloaded. If the configuration parameter values are the best ones, then the solution is used at its best capability.

EXAMPLES

For $\alpha=0$, $\beta=1$, $\gamma=0$, $\nu=1$, the limit will be equal to the number of free batch processes:

$$\text{Limit}^{(1)}_{0,0,1}(t) = b(t)$$

For $\alpha=0$, $\beta=2$, $\gamma=0$, $\nu=1$, the limit will be twice to the number of free batch processes:

$$\text{Limit}_{0,2,0}^{(1)}(t)=2\cdot b(t)$$

For $\alpha=1$, $\beta=1$, $\gamma=0$, $\nu=1$, the limit will be equal to the number of free batch processes plus one so, even if the number of free batch process is zero, the limit is $$\text{Limit}_{1,1,0}^{(1)}(t)=1+b(t)$$

For $\alpha=0$, $\beta=1$, $\gamma=-1$, $\nu=1$, a batch process is always left free and the limit will be equal to the number of free batch processes less one:

$$\text{Limit}_{0,1,-1}^{(1)}(t)=b(t)-1$$

Even if the solution of the preferred embodiment has been described has been described when one source system schedules batch jobs for execution in one target system, the person skilled in the art can easily adapt the control program to control in the same way one source system scheduling batch jobs for execution in more than one target system. For example, one adaptation could be managing one local queue per each couple (source system, target system).

The preferred embodiment implements a double level of synchronization because the external system is updated for any change in the target execution system and will not submit an overloading number jobs, and the target execution system will have an execution queue that does not exceed the maximum number of executable jobs.

The preferred embodiment allows optimizing resource utilization and throughput of job execution in external systems such as application container systems. The preferred embodiment is based on a double level mechanism that allows a fine grained optimization by manual customization or automatic adaptive tuning. The double level job throttling mechanism of the preferred embodiment includes a first level to control children jobs spawned by other running jobs and a second level.

The preferred embodiment is "resource" based. It measures the number of background processes available at a given time instant. The principle is one independent entity polling schedulers of the external systems without staying in between mediating data. This entity acts tuning the two schedulers' behaviors by limiting job scheduling on the target execution system and controlling release of jobs sent for execution on the target execution system.

The preferred embodiment provides the following advantages. First, it does not require changes in the two schedulers only the standard APIs provided by the external systems are used. Second, it does not require any change of the connection between the originating external system and the target execution system. Third, it is stateless as it does not need historical data or statistics, but it can benefit from statistics data for an automatic tuning.

The preferred embodiment starts from an existing control program which can define an interception rule that can suspend batch jobs scheduled by a source system before their actual execution in a target system at fixed time intervals. The preferred embodiment retrieves the list of suspended jobs and, accordingly to user-defined policies, resumes them. The preferred embodiment is enhanced by adding a second level throttling system to optimize use of resources for batch execution in the target system. At a fixed time interval, the preferred embodiment checks the number of free batch processes in the target system. This value is used to calculate the maximum number ("limit") of jobs that can be concurrently submitted into the target system. Since batch jobs can spawn children jobs during their execution, the combination of the above three actions (to limit concurrent job submission, to define suspension rules, to resume suspended jobs) can be tuned to optimize job execution throughput.

All the configuration parameters used in this preferred embodiment can be manually defined or can be automatically evaluated by a statistical analysis system, which monitors job execution throughput and adjusts the configuration to get the best performance.

The invention claimed is:

1. A method of managing jobs scheduled for execution on a target system in which some jobs may spawn additional jobs scheduled for execution on the target system comprising:
   intercepting, by a data processing system, jobs scheduled for execution in the target system;
   determining whether there is resource sufficiency in the target system for executing jobs;
   responsive to an affirmative determination of resource sufficiency, releasing by the data processing system previously intercepted jobs for execution in the target system;
   computing a limit of a number of jobs which can be concurrently scheduled by an external system to the target system; and
   transmitting the computed limit to the external system;
   wherein computing the limit of the number of jobs which can be concurrently scheduled by the source system comprises:
   reading the amount of resource available at this t time $b(t)$ to execute batch jobs in the target system; and
   in part by using $\alpha$, $\beta$, $\gamma$ and $\nu$ parameter values, computing the limit at this t time:

$$\text{Limit}(t)=\alpha+\beta\cdot f(b(t)+\gamma)$$

wherein f is a function providing an average value of the amounts of available resource measured n times.

2. The method of claim 1 further comprising identifying whether there are any new jobs scheduled for execution by the target system and determining whether any new jobs may be intercepted prior to intercepting jobs wherein computing the limit is responsive to a negative determination of new jobs that may be intercepted.

3. The method of claim 1 further comprising determining whether there are any jobs scheduled for execution by the target system wherein computing the limit is responsive to a negative determination of any jobs scheduled for execution.

4. The method of claim 1 wherein computing at this t time comprises using as f, the Simple Moving Average of length n, the resulting limit being:

$$\text{Limit}_{\alpha,\beta,\gamma}^{(\nu)}(t) = \alpha + \frac{\beta}{\nu}\cdot \sum_{k=1}^{\nu}(b(t-k+1)+\gamma).$$

5. The method of claim 1 wherein computing at this t time comprises using as f, the Exponential Moving Average of length n $$\text{EMA}^{(n)}(x_i)=\eta\cdot x_i+(1-\eta)\cdot\text{EMA}^{(n)}(x_{i-1}).$$

6. The method of claim 1 wherein the $\alpha$, $\beta$, $\gamma$ and $\nu$ parameters are read in a configuration file previously updated.

7. The method of claim 1 wherein the $\alpha$, $\beta$, $\gamma$ and $\nu$ parameter values are computed automatically by a control program using collected statistical data from resources used in the target system.

8. The method of claim 1 wherein computing the limit and transmitting the computed limit are performed for more than one external system.

9. The method of claim 1 wherein the data processing system comprises a control program not in the target system or the external system which performs the steps of intercepting, determining, releasing, computing and transmitting and wherein communicating with the external system or the target system from the control program uses a standard remote interface provided by the external system or the target system, said control program being executed on a computer remote from the external system or the target system.

10. A method of managing jobs scheduled for execution on a target system in which some jobs may spawn additional jobs scheduled for execution on the target system comprising:
periodically detecting jobs scheduled for execution in the target system, the jobs including a first set of jobs received from a first set of source systems and a second set of jobs received from a second set of source systems, wherein the first set of jobs cannot be suspended due to the first set of jobs being received from the first set of source systems, wherein the second set of jobs includes spawned lobs from the first set of lobs, and wherein the second set of jobs can be suspended due to the second set of jobs being received from the second set of source systems;
suspending detected jobs scheduled for execution in the target system from the second set of jobs, determining whether there is resource sufficiency in the target system for executing any of the jobs not suspended, and responsive to an affirmative determination of resource sufficiency, releasing the previously suspended jobs for execution in the target system; and
when no job from the second set of jobs is available to be suspended as well as when all suspended jobs have been released for execution in the target system, computing a limit of a number of jobs which should be concurrently scheduled by the first set of source systems based on target system resource availability, and providing the computed limit to the first set of source systems, thereby managing the number of jobs scheduled for execution by the first set of source systems within target system resource availability.

11. The method of claim 10 wherein only new jobs scheduled for execution in the target system from the first and second set of source systems since the previous periodic detection are detected.

12. The method of claim 11 wherein releasing previously suspended jobs includes concurrently releasing previously suspended jobs that spawn from a single job.

13. The method of claim 10 wherein the second set of jobs includes internally submitted jobs.

14. The method of claim 10 wherein the first set of source systems includes a plurality of external systems.

15. The method of claim 10 wherein a control program, not in the target system and not in the first set of source systems, performs the steps of detecting, periodically suspending, determining, releasing, computing and providing; and wherein communicating with the first set of source systems and the target system from the control program uses a standard remote interface provided by the first set of source systems or the target system, said control program being executed on a computer remote from the first set of source systems or the target system.

16. The method of claim 10 wherein computing the limit of the number of jobs which can be concurrently scheduled by the first set of source systems based on target system resource availability comprises:
reading the amount of resource available at this t time b(t) to execute batch jobs in the target system;
using $\alpha, \beta, \gamma$ parameter values, computing the limit at this t time:

$$\text{Limit}(t) = \alpha + \beta \cdot f(b(t) + \gamma)$$

wherein f is a function providing an average value of the amounts of available resource measured a plurality of times.

17. The method of claim 10 further comprising utilizing a data processing system including a processor and a non-transitory memory for storing computer usable code for execution by the processor to perform the method.

* * * * *